(12) United States Patent
He et al.

(10) Patent No.: US 10,800,284 B2
(45) Date of Patent: Oct. 13, 2020

(54) CHARGING STRATEGIES TO MITIGATE LITHIUM PLATING IN ELECTRIFIED VEHICLE BATTERY

(71) Applicant: Ford Global Technologies, LLC, Dearborn, MI (US)

(72) Inventors: Chuan He, Northville, MI (US); Feng Li, Troy, MI (US); Ruiqi Mao, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 926 days.

(21) Appl. No.: 15/001,618

(22) Filed: Jan. 20, 2016

(65) Prior Publication Data

US 2017/0203667 A1   Jul. 20, 2017

(51) Int. Cl.
| | |
|---|---|
| *B60L 58/15* | (2019.01) |
| *B60L 58/27* | (2019.01) |
| *B60L 58/21* | (2019.01) |
| *B60L 53/62* | (2019.01) |
| *H01M 10/0525* | (2010.01) |

(Continued)

(52) U.S. Cl.
CPC ............. *B60L 58/15* (2019.02); *B60L 53/62* (2019.02); *B60L 58/21* (2019.02); *B60L 58/27* (2019.02); *H01M 10/0525* (2013.01); *H01M 10/441* (2013.01); *H01M 10/46* (2013.01);
(Continued)

(58) Field of Classification Search
None
See application file for complete search history.

(56) References Cited

U.S. PATENT DOCUMENTS

| 5,729,116 A | 3/1998 | Tsenter |
| 5,998,969 A | 12/1999 | Tsuji et al. |

(Continued)

FOREIGN PATENT DOCUMENTS

| JP | 2001218378 A | * | 8/2001 |
| WO | 2015077669 A1 | | 5/2015 |

OTHER PUBLICATIONS

Machine Translation of JP2001218378A.*
(Continued)

*Primary Examiner* — David V Henze-Gongola
(74) *Attorney, Agent, or Firm* — David Kelley; Brooks Kushman P.C.

(57) ABSTRACT

A vehicle includes a traction battery and a controller in communication with the battery and programmed to control battery charging in response to a user-selected one of a plurality of charging strategies having different charging rates based on detection of lithium plating in the battery. The charging strategies may include options for faster charging with an urgent or emergency charging strategy selectable a limited number of times to mitigate battery performance degradation associated with lithium plating. A method implemented by a vehicle controller in a vehicle having a traction battery, may include controlling, by the controller, battery charging in response to a user-selected charging strategy selected from one of a plurality of available charging strategies each having a different charging rate and displayed on a user interface in response to detection of lithium plating in the traction battery, at least one charging strategy associated with additional lithium plating if selected.

19 Claims, 4 Drawing Sheets

(51) Int. Cl.
*H01M 10/44* (2006.01)
*H01M 10/46* (2006.01)

(52) U.S. Cl.
CPC ........ *H01M 2220/20* (2013.01); *Y02E 60/122* (2013.01); *Y02T 10/7011* (2013.01)

(56) References Cited

U.S. PATENT DOCUMENTS

| | | | |
|---|---|---|---|
| 6,040,685 A | 3/2000 | Tsenter et al. | |
| 6,366,056 B1 | 4/2002 | Podrazhansky et al. | |
| 8,901,885 B2 | 12/2014 | Kelty et al. | |
| 2006/0022646 A1* | 2/2006 | Moore | H02J 7/0016 320/150 |
| 2011/0298417 A1 | 12/2011 | Stewart et al. | |
| 2012/0306446 A1* | 12/2012 | Suganuma | B60L 11/1824 320/109 |
| 2016/0144737 A1* | 5/2016 | Liu | B60L 11/182 320/149 |
| 2017/0163046 A1* | 6/2017 | Patil | H02J 7/0052 |
| 2017/0234930 A1* | 8/2017 | Lee | G01R 31/3624 320/162 |

OTHER PUBLICATIONS

J.C. Burns, D.A. Stevens, and J.R. Dahn; In-Situ Detection of Lithium Plating Using High Precision Coulometry; Journal of the Electrochemical Society; Jan. 19, 2015; pp. 959-964; Department of Physics and Atmospheric Science, Dalhousie University, Halifax, Nova Scotia B3H 4R2, Canada.

Mathias Petzl and Michael A. Danzer; Nondestructive detection, characterization, and quantification of lithium plating in commercial lithium-ion batteries; Journal of Power Sources 254; Aug. 20, 2013; pp. 80-87.

* cited by examiner

CHARGING STRATEGIES TO MITIGATE LITHIUM PLATING IN ELECTRIFIED VEHICLE BATTERY

CROSS-REFERENCE TO REALATED APPLICATIONS

This application includes subject matter similar to commonly owned U.S. Ser. Nos. 15/001,520, filed Jan. 20, 2016; and 15/001,562, filed Jan. 20, 2016.

TECHNICAL FIELD

This disclosure relates to charging strategies to mitigate lithium plating in an electrified vehicle battery.

BACKGROUND

Electrified vehicles, such as hybrid, plug-in hybrid, and battery electric vehicles use an electric machine powered by a traction battery to drive the vehicle powertrain. Charging and discharging of the battery results in electrochemical processes that affect the charge available to power the vehicle and may vary with ambient and operating conditions such as battery state of charge (SOC), temperature, battery cell balance, and charging/discharging rate or current, for example. In lithium-ion (Li-ion) batteries, metallic lithium may be deposited on the anodes of battery cells under some operating conditions, which may degrade battery performance. Batteries are particularly susceptible to this process, referred to as lithium plating, under low operating temperature and high charging currents, although lithium plating may occur under other ambient and operating conditions.

Range anxiety is often an obstacle to adoption of electrified vehicles and refers to customers concerned about not having a sufficient battery charge to reach a particular destination, or having to wait for several hours to recharge the battery enroute for battery electric vehicles. Various charging strategies have been developed to provide faster charging for vehicles that have a depleted battery, or when the driver does not have sufficient time available for conventional charging. However, these charging strategies may result in lithium plating and associated battery performance degradation, particularly when charging at low temperatures.

SUMMARY

In various embodiments, a vehicle includes a traction battery having a plurality of cells and a controller in communication with the traction battery and programmed to control traction battery charging in response to a user-selected one of a plurality of charging strategies having different charging rates based on detection of lithium plating in the traction battery. The controller may be programmed to store an accumulated number of selections for at least one of the charging strategies, and to limit the number of selections for the at least one charging strategies. The controller may be programmed to prompt a user for a charging strategy selection in response to detection of lithium plating. In one embodiment, the controller is programmed to communicate with a linked mobile device, such as a smart phone to receive input associated with the user-selected charging strategy. The controller may also be programmed to implement a default charging strategy to mitigate lithium plating in response to detection of lithium plating until a user-selected charging strategy is selected. The default charging strategy reduces traction battery charging rate relative to a charging strategy where no lithium plating is detected. At least one of the plurality of charging strategies includes increasing battery charging current to a charging rate that may result in reversible or irreversible lithium plating to reduce charging time.

Embodiments according to the disclosure may include a vehicle having a traction battery with at least one cell and a controller coupled to the traction battery and programmed to control traction battery charging in response to a user-selected charging strategy based on a prompt to select a charging strategy initiated in response to traction battery lithium plating being detected by the controller. The controller may be programmed to prompt a user for selection of one of a plurality of charging strategies with at least one of the plurality of charging strategies resulting in a charging current associated with additional lithium plating to reduce charging time. The controller may be programmed to limit a number of times the at least one of the plurality of charging strategies associated with additional lithium plating may be selected. The controller may be programmed to present the at least one of the plurality of charging strategies only if an accumulated number of selections of the at least one of the plurality of charging strategies associated with additional lithium plating is less than a predetermined number stored in a memory in communication with the controller. In one embodiment, the vehicle includes a display having a user interface configured to prompt a user for selection of one of a plurality of charging strategies each associated with a different charging rate and lithium plating level. The controller may be programmed to receive user input from a linked wireless device having a user interface configured to prompt a user to select one of a plurality of charging strategies.

One or more embodiments include a method implemented by a vehicle controller in a vehicle having a traction battery, the method controlling, by the controller, traction battery charging in response to a user-selected charging strategy selected from one of a plurality of available charging strategies each having a different charging rate and displayed on a user interface in response to detection of lithium plating in the traction battery, at least one charging strategy associated with additional lithium plating if selected. The method may also include displaying an estimated charging time for each of the plurality of available charging strategies on the user interface, and limiting user selection of the at least one charging strategy to a predetermined number of selections.

Embodiments according to the present disclosure may provide one or more advantages. For example, various embodiments provide flexibility for the vehicle driver to select a particular charging strategy for faster charging that may result in reversible lithium plating, or a limited amount of irreversible lithium plating to accommodate various driver needs. The system and method may communicate estimated charging time to avoid lithium plating to a user and allow the user to override the default charging mode to select a faster charging strategy. An urgent or emergency charging mode provides the fastest charging and may be activated only a limited number of times to avoid significant degradation of battery performance. Mitigation of lithium plating according to various embodiments may extend battery operation and capacity range and increase the useful battery life. Selection of a charging strategy may improve customer satisfaction and reduce range anxiety. The charging strategies according to various embodiments do not require any added hardware, provide accurate on-board detection of lithium plating conditions, and can be used for battery electric vehicles and plug-in hybrid electric vehicles. The charging strategy may be selected or controlled remotely by a connected mobile device, such as a smart phone, or via a user interface of the vehicle.

The above advantages and other advantages and features associated with various embodiments will be readily apparent to those of ordinary skill in the art from the following detailed description when taken in connection with the accompanying drawings.

DETAILED DESCRIPTION

As required, detailed embodiments are disclosed herein; however, it is to be understood that the disclosed embodiments are merely representative of the claimed subject matter and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The embodiments of the present disclosure may include various internal and external circuits or other electrical/electronic devices. All references to the circuits and other devices or components and the functionality provided by each, are not intended to be limited to encompassing only what is illustrated and described herein. While particular labels may be assigned to the various circuits or other devices disclosed, such labels are not intended to limit the scope of operation for the devices. Such circuits and other devices may be combined with each other and/or separated in any manner based on the particular type of implementation that is desired. It is recognized that any circuit or other device disclosed herein may include any number of discrete passive and active components such as resistors, capacitors, transistors, amplifiers, analog/digital converters (ADC or A/D converters), microprocessors, integrated circuits, non-transitory memory devices (e.g., FLASH, random access memory (RAM), read only memory (ROM), electrically programmable read only memory (EPROM), electrically erasable programmable read only memory (EEPROM), or other suitable variants thereof) and software which cooperate with one another to perform operation(s) disclosed herein. In addition, any one or more of the devices may be configured to execute a computer program that is embodied in a non-transitory computer readable storage medium that includes instructions to program a computer or controller to perform any number of the functions as disclosed.

Figure 1:
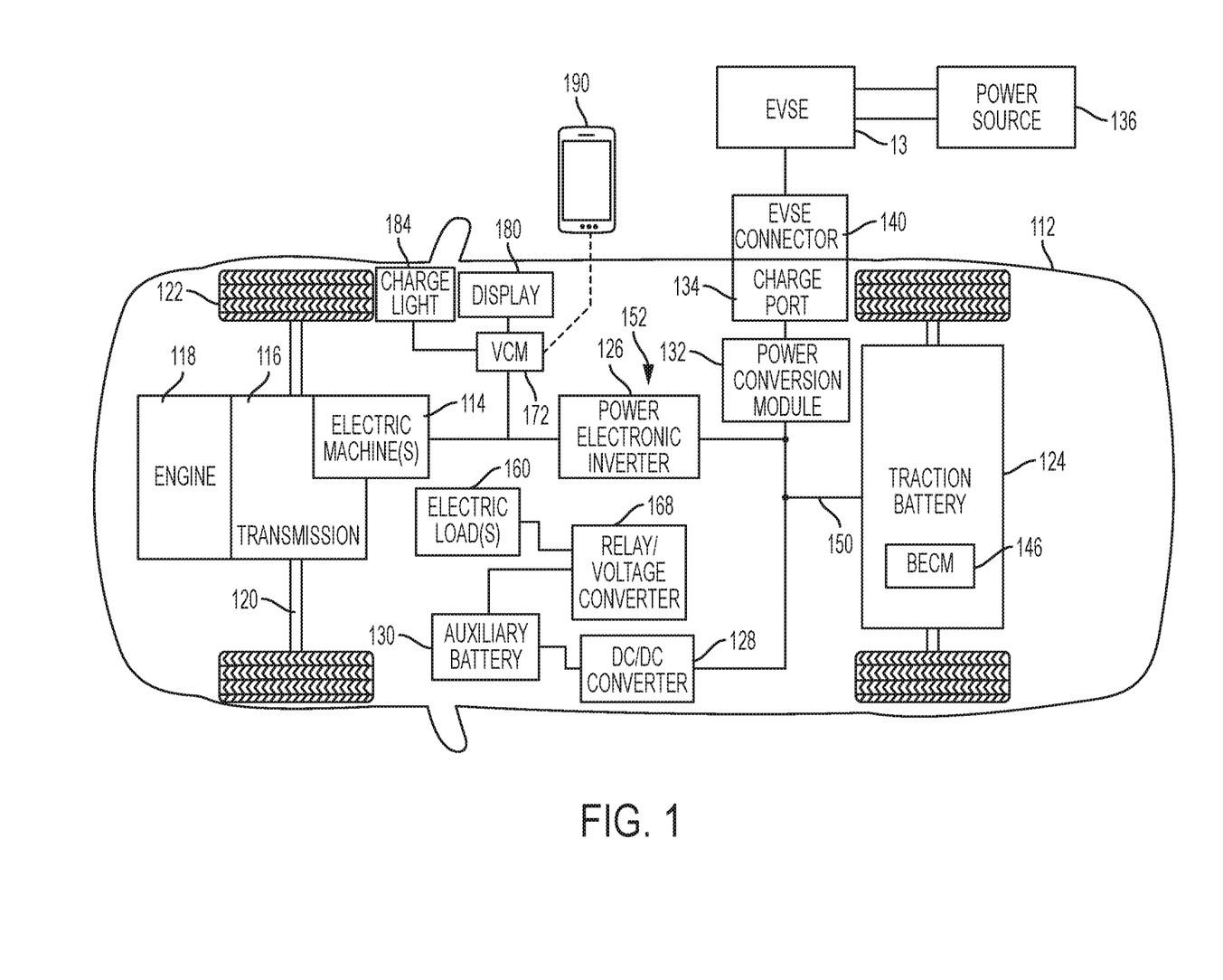
FIG. 1 is a block diagram illustrating an electrified vehicle selectable charging strategies in response to detection of lithium plating according to a representative embodiment.

FIG. 1 is a block diagram of a representative electrified vehicle embodiment having at least one controller programmed to control battery charging in response to a user-selected charging strategy after detecting traction battery lithium plating. While a plug-in hybrid vehicle having an internal combustion engine is illustrated in this representative embodiment, those of ordinary skill in the art will recognize that the disclosed embodiments illustrating prompting and selection of a battery charging strategy based on lithium plating detection may also be utilized in other types of electrified vehicles. The systems and methods for controlling battery charging based on a user-selected charging strategy in the representative embodiments are independent of the particular vehicle powertrain with exceptions apparent to those of ordinary skill in the art. For example, controlling an engine to reduce current supplied to the traction battery would not be applicable to a battery electric vehicle. Representative vehicle applications may include hybrid vehicles, electric vehicles, or any other type of vehicle having a battery subject to performance degradation associated with lithium plating where one or more charging strategies may be selected by a user in response to lithium plating detection.

In the representative implementation illustrated in FIG. 1, a plug-in hybrid-electric vehicle 112 may include one or more electric machines 114 mechanically connected to a transmission 116. The electric machines 114 may be capable of operating as a motor or a generator. For hybrid vehicles, a transmission 116 is mechanically connected to an internal combustion engine 118. The transmission 116 is also mechanically connected to a drive shaft 120 that is mechanically connected to the wheels 122. The description herein is equally applicable to a battery electric vehicle (BEV), where the hybrid transmission 116 may be a gear box connected to an electric machine 114 and the engine 118 may be omitted as previously described. The electric machines 114 can provide propulsion and deceleration capability whether or not the engine 118 is operating. The electric machines 114 also act as generators and can provide fuel economy benefits by recovering energy that would normally be lost as heat in the friction braking system during regenerative braking. As described in greater detail below, the engine 118 may be controlled to modify power supplied to electric machines 114 based on a selected battery charging strategy after detecting lithium plating.

For hybrid or electric vehicle applications, a traction battery or traction battery pack 124 stores energy in a plurality of individual battery cells connected together to provide a desired voltage and charge capacity for the electric machines 114 and various vehicle electrical accessories. In one embodiment, battery pack 124 includes an array of lithium-ion battery cells. Lithium plating (also referred to herein as "plating") refers to the process where metallic lithium is deposited on the negative electrodes or anodes of the battery cells and may lead to long-term effects such as capacity loss, increased impedance, decreased efficiency, and in some cases an internal short circuit, for example, depending on the particular structural characteristics of the deposited lithium. Some degree of plating may be reversed during a process referred to as stripping during subsequent discharging cycles. Irreversible plating may result in permanent damage to the cell anode. As such, various embodiments according to the present disclosure utilize a vehicle or battery controller programmed to prompt a user to select a battery charging strategy in response to detection of lithium plating to accommodate a user's desire for faster charging while mitigating reversible or irreversible lithium plating. The selected charging strategy may control charging and discharging to strip reversibly plated anodes as well as to reduce or eliminate additional plating. Battery cells are particularly susceptible to plating during charging at low temperatures, high state of charge (SOC), and high charging rates (high current). As such, the charging strategies may control one or more components or accessories to directly or indirectly warm the battery by increasing battery current or operating a battery heater, for example. Various strategies may be used to calculate a lithium plating indicator value for use by the controller in detecting lithium plating and prompting for an alternative charging strategy with representative indicators illustrated and described with reference to FIGS. 2-3.

Vehicle battery pack 124 typically provides a high voltage DC output to a high voltage bus 150, although the voltage and current may vary depending on particular operating conditions and loads. The traction battery pack 124 is electrically connected to one or more external circuits 152, which may include a power electronics or inverter circuit 126, a DC/DC converter circuit 128 and/or a power conversion module or circuit 132, for example. One or more contactors may isolate the traction battery pack 124 from other components when opened, and connect the traction battery pack 124 to the other components when closed. Traction battery pack 124 may include various internal circuits for measuring and monitoring various operating parameters including cell current and individual cell voltage. Parameters such as voltage, current and resistance for a battery cell or a group of battery cells (sometimes referred to as a block or brick) may be monitored and/or controlled by the BECM 146. Various battery desired or target values, as well as nominal values associated with plated or unplated cells, may be stored in a memory associated with the BECM 146 for use in detecting plating. For example, cell internal resistance may be empirically determined for a representative traction battery and then stored in memory as a parameter or calibration value for all similar types of batteries for use in subsequent detection of lithium plating and/or control of the battery and vehicle.

In addition to providing energy for propulsion, the traction battery pack 124 may provide energy for other external circuits 152 connected to the high voltage bus 150. The power distribution system of vehicle 112 may also include a DC/DC converter module or circuit 128 that converts the high voltage DC output of the traction battery 124 to a low voltage DC supply that is compatible with other vehicle loads that may be directly connected. Other external high voltage circuits or loads, such as those for cabin or component heaters, such as a battery heater, may be connected directly to the high voltage bus 50 without the use of a DC/DC converter module 128.

Vehicle 112 may also include an auxiliary battery 130 having a relatively lower nominal voltage (such as 24V or 48V, for example) and may be implemented using different battery chemistry than the traction battery pack 124. Auxiliary battery 130 may also be referred to as a low-voltage battery, starter battery or simply the vehicle battery for various applications. Auxiliary battery 130 may be used to power various low-voltage components, controllers, modules, motors, actuators, sensors, etc. generally represented by electric loads 160. One or more relay/voltage converters 168 may be used to power vehicle electrical load(s) 160. In this embodiment, relay/voltage converter 168 includes a relay controlled by a relay input signal provided by a vehicle control module (VCM) 172, which may also be used to directly or indirectly control the vehicle and/or traction battery 124 using the battery energy control module (BECM) 146. As described in greater detail below, one or more electrical components or accessories may be controlled by VCM 172 and/or BECM 146 to control lithium plating by controlling battery current.

Traction battery pack 124 may be recharged by an external power source 136. The external power source 136 may include an electrical outlet connected to the power grid. The external power source 136 may be electrically connected to electric vehicle supply equipment (EVSE) 138. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be electrically connected to a charger or on-board power conversion module 132. Alternatively, various components described as being electrically connected may transfer power using a wireless inductive coupling. As described in greater detail below, the power conversion module 132 is another representative electrical device that may be directly or indirectly controlled to limit or reverse lithium plating by controlling battery current. In some applications, battery current may be reduced or stopped during charging, or may be reversed to provide current to the external power source 136 to reduce or reverse lithium plating.

The various components illustrated in FIG. 1 may have one or more associated controllers, control modules, and/or processors such as VCM 172 to control vehicle and traction battery operation based on a lithium plating indicator value or detection of lithium plating. The controllers may communicate via a serial peripheral interface (SPI) bus (e.g., Controller Area Network (CAN)) or via discrete conductors. Various operating parameters or variables may be broadcast or published using the CAN or other conductors for use by vehicle control modules or sub-modules in controlling the vehicle or vehicle components, such as the traction battery pack 124 or electric load(s) 160, for example. One or more controllers may operate in a stand-alone manner without communication with one or more other controllers. The controllers may include a Battery Energy Control Module (BECM) 146 to control various charging and discharging functions, battery cell charge balancing, battery pack voltage measurements, individual battery cell voltage measurements, battery over-charge protection, battery over-discharge protection, battery end-of-life determination, closed loop feedback control of lithium plating, battery current polarity or direction (charging and discharging), etc.

The controllers may include and/or communicate with various types of non-transitory computer readable storage media including persistent and temporary storage devices to store control logic, algorithms, programs, operating variables, calibration data, target, nominal, or desired values, and the like. Data may be stored in an array or lookup table accessed or indexed by one or more operating parameters. In one embodiment, the BECM 146 may communicate with memory for storing values associated with battery cell desired open circuit voltage values, thresholds, or patterns. Similarly, BECM 146 may communicate with memory having values stored in lookup tables or arrays associated with battery cell internal resistance based on battery parameters such as temperature, SOC, age, etc.

As also illustrated in FIG. 1, VCM 172 may communicate with a vehicle display 180 that provides a user interface for vehicle occupants. Display 180 may include programmed or touch-sensitive areas to receive user input as well as programmable or fixed buttons, knobs. sliders, dials, etc. Display 180 may be programmed via VCM 172 or another vehicle controller in communication with display 180 to prompt for a charging strategy selection in response to VCM 172 or BECM 146 detecting lithium plating as illustrated and described in greater detail with reference to FIGS. 2-4. Display may also be programmed to provide informational messages for vehicle occupants with respect to vehicle or traction battery operating status, operating mode, distance to empty, time required to complete charging, etc. A battery charge indicator, such as charge light 184 may also be used to communicate charge status or mode to those outside the vehicle. For example, charge light 184 may illuminate in a different color or pattern when charging is limited or restricted in response to detection of lithium plating. Charge light 184 may also display an estimate of battery state of charge (SOC) based on the brightness or number of segments illuminated, for example.

Various embodiments may include the capability to link a mobile device 190, such as a smart phone, to VCM 172. Mobile device 190 may include a processor, memory, and transceiver to wireless exchange input and output with VCM 172. Alternatively, or in combination, mobile device 190 may be connected or linked to VCM 172 through a wired connector. Mobile device 190 may be programmed by an application program or app to provide a secure link or pairing to a particular vehicle 112 using a short-range connection, such as WiFi or BLUETOOTH, and/or using a long-range connection using cellular and/or satellite connections. Mobile device 190 includes a user interface programmed or configured to receive user input for selection of a charging strategy in response to detection of lithium plating. VCM 172 may transmit data to mobile device 190 to activate or trigger the user interface to prompt for user input relative to a charging strategy in response to detection of lithium plating. Various other vehicle and/or battery control functions may be performed by an authorized mobile device 190 directly or indirectly linked to VCM 172. Alternatively, or in combination, similar functions may be performed using display 180.

Figure 2:
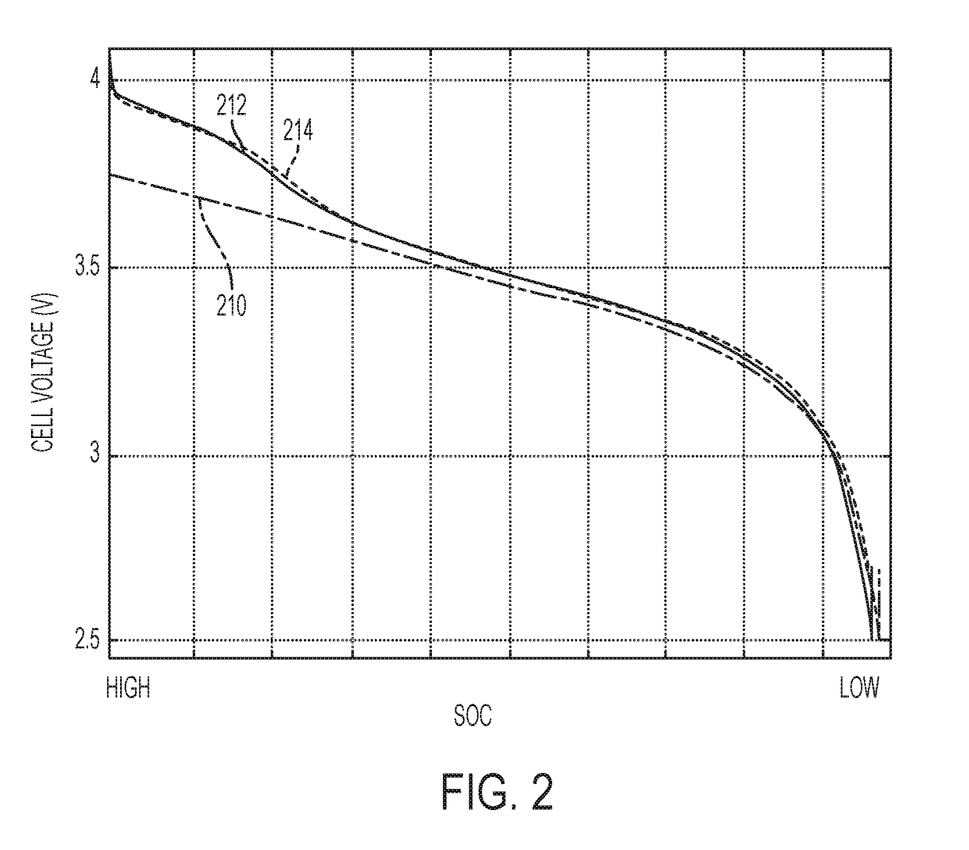
FIG. 2 is a graph illustrating cell voltage as a function of SOC for unplated and plated battery cells for use in detecting lithium plating and prompting for an alternative charging strategy according to a representative embodiment.

FIG. 2 is a graph illustrating cell voltage as a function of SOC for unplated and plated battery cells for use in calculating a lithium plating indicator value for use in detecting lithium plating and prompting for charging strategy selection according to a representative embodiment. The graph of FIG. 2 was generated using empirical data for representative lithium-ion cells that may be used in a battery pack in an electrified vehicle such as the plug-in hybrid electric vehicle illustrated in FIG. 1. Data represented by line 210 correspond to cell voltage during discharging over time for a normal lithium-ion cell with little or no plating. Data represented by lines 212, 214 correspond to cell voltages during discharging over time for lithium plated cells with plating confirmed by disassembly and examination of visibly damaged anodes of the plated cells. Due to the chemical characteristics of lithium, when a battery cell is plated as previously described, the battery cell open circuit voltage (OCV) will be higher than a cell that has less or no plating.

In various embodiments, the expected or normal battery OCV, and/or the expected battery cell internal resistance for particular battery operating parameters, such as temperature, current, SOC, age, etc. may be stored in a memory in communication with the BECM 146. The lithium plating indicator value may correspond to a difference between a measured OCV of a least one cell and the previously stored expected OCV under similar operating conditions. The measured OCV can be calculated based on a measured battery cell voltage, current flow through the battery cell, and the battery cell internal resistance as calculated or previously stored in a memory associated with the battery control system according to:

$$OCV = V\_battery - I * R\_cell$$

where OCV represents the battery cell open circuit voltage (V), V_battery represents the measured battery cell voltage (V), I represents the current flow through the battery cell (A), and R_cell represents the battery cell internal resistance (ohms). The lithium plating indicator value corresponding to the differential OCV is then used by the closed loop feedback control the lithim plating. The plating indicator value based on a differential voltage of a cell or group or brick of cells may be determined according to:

$$\text{Plating Indicator} = OCV_{measured} - OCV_{expected}$$

One or more controllers in communication with the traction battery may be programmed to detect lithium plating by comparing the differential voltage to an associated threshold.

Figure 3:
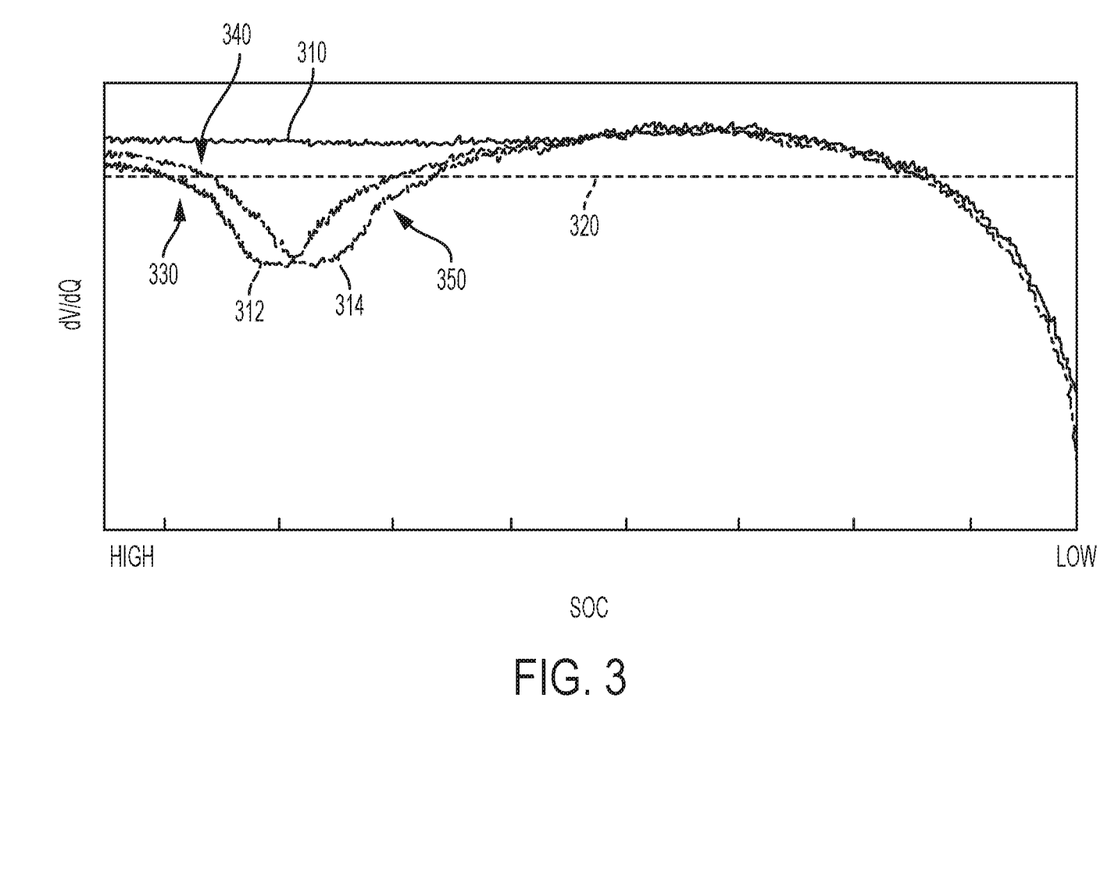
FIG. 3 is a graph illustrating a ratio of cell voltage changing rate to cell charging rate as a function of time for unplated and plated battery cells for use in detecting lithium plating and prompting for an alternative charging strategy according to a representative embodiment.

FIG. 3 is a graph illustrating a ratio of cell voltage changing rate to cell charging rate as a function of time for unplated and plated battery cells for use as a plating indicator value for detection of lithium plating and prompting for a charging strategy selection according to a representative embodiment. Data represented by line 310 correspond to ratios for a battery cell with little or no lithium plating, while data represented by lines 312, 314 correspond to ratios for battery cells exhibiting lithium plating. Line 320 corresponds to a representative threshold that may be used to compare the ratios for detection of lithium plating with lithium plating detected in response to the calculated ratio crossing the threshold as indicated at 330 for line 312 and 340 for line 314, for example.

Those of ordinary skill in the art will recognize that the particular threshold may vary based on battery and/or ambient operating parameters or conditions and may be stored in memory configured as a lookup table or may be computed based on a formula or equation using empirical data to generate a mathematical expression for the threshold or estimated online. Similarly, the pattern formed by the data of one or more cells over time may be compared to a corresponding expected or desired pattern for a cell without plating with a mathematical or statistical parameter, such as correlation, used to detect plating. Similarly, other ratios may be computed and used to detect plating based on empirical data associated with plated cells. The plating indicator may be used by a closed loop controller to control the charging of the battery based on a charging strategy selected in response to detection of lithium plating.

As generally illustrated in FIG. 3, for a lithium plated battery cell, the ratio of cell voltage changing rate or differential voltage vs. cell charging rate (which may be indicated by cell current, for example), will have a clear transition when the plated lithium has stopped joining the reaction during the process. Since the ratio of cell voltage changing rate vs. cell charging rate as represented by lines 310, 312, and 314 is robust compared with a time based ratio, it is also robust to various battery operation conditions. As such, lithium plating can be controlled using the ratio of cell voltage changing rate vs. cell charging rate to minimize or prevent the ratio from crossing the associated threshold indicating lithium plating. It is also possible to detect the pattern of lithium plating and use this information to control and or track lithium plating.

As previously described with respect to FIG. 2, due to the chemical characteristics of lithium and the carbon anode of each battery cell, when a battery is plated, the battery cell OCV will be higher than normal or nominal battery open circuit voltage without plating. When the lithium stops joining the reaction, the cell OCV will go back to a normal OCV as generally indicated at 350. In various applications, battery cell voltage is measured inside the battery pack for individual cells or groups or bricks of cells such that the differential voltage for a particular cell or group of cells dV/dt can be calculated. The cell charging rate or rate of change of cell charge may be represented by the actual cell current (I) as represented by:

$$\frac{dQ}{dt} = I$$

The ratio of cell voltage changing rate vs. cell charge rate may be calculated as a plating indicator value by a vehicle or battery controller according to:

$$\text{ratio (plating indicator value)} = \frac{dV\_battery}{dQ} = \left(\frac{dV\_battery}{dt}\right) \Big/ \left(\frac{dQ}{dt}\right) = \left(\frac{dV}{dt}\right) \Big/ I$$

where Q represents the battery cell accumulated charge (Coulomb), V_battery represents measured battery cell voltage (V), and I represents current flow through the battery cell (A). Filters may be applied before and/or after the differential operation/calculation to reduce or eliminate signal noise.

Figure 4:
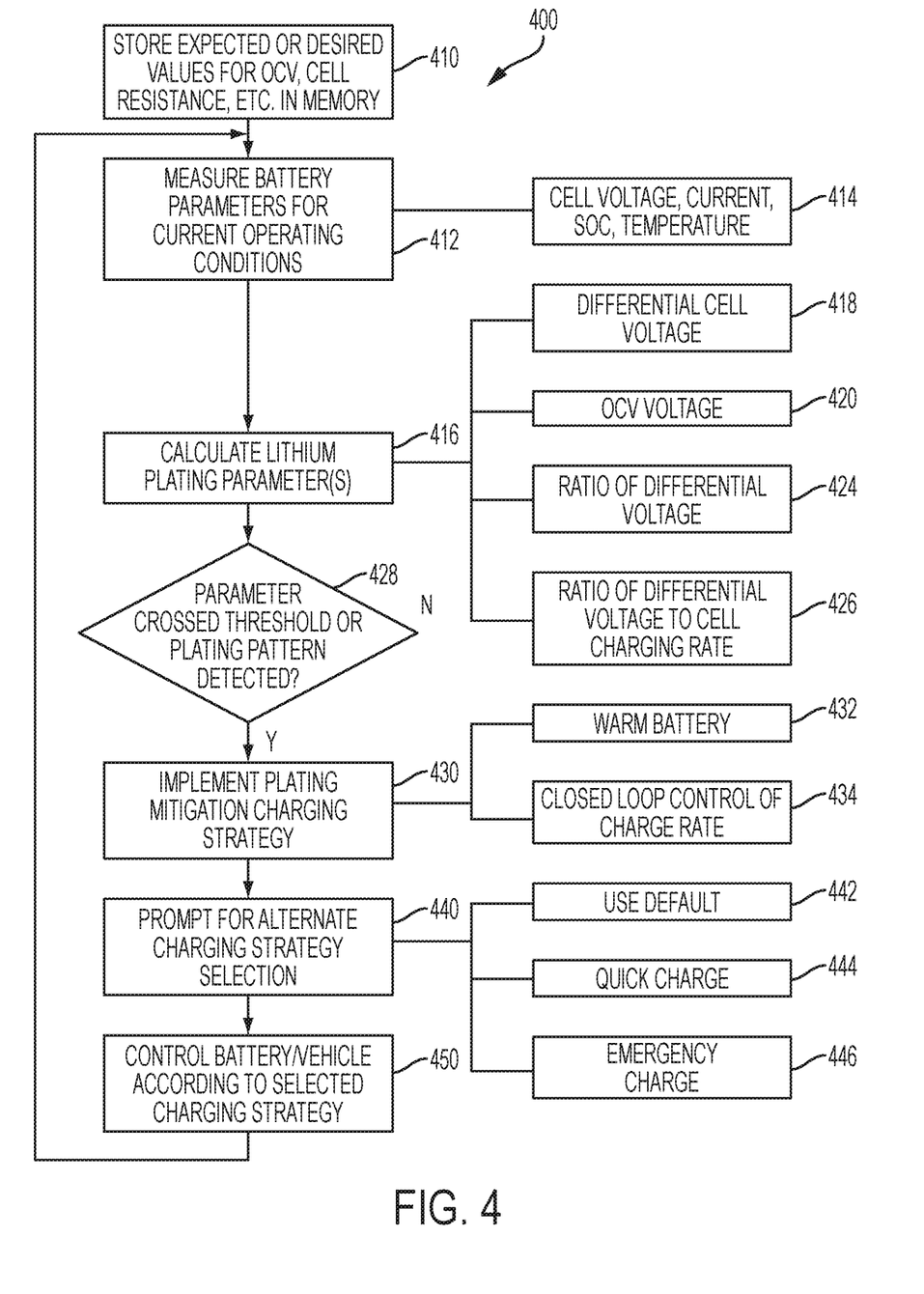
FIG. 4 is a flow chart illustrating operating of a system or method selection and implementation of a charging strategy in response to detection of lithium plating according to a representative embodiment.

FIG. 4 is a flow chart illustrating calculation of one or more lithium plating indicators or parameters for use in detecting lithium plating and prompting for a battery charging strategy selection according to a representative embodiment. The processes, systems, methods, heuristics, etc. described herein may be described as occurring in an ordered sequence although such processes could be performed with the described steps completed in an order other than the order described or illustrated. It should be understood that certain operations or functions could be performed simultaneously, that other operations or functions could be added, or that certain operations or functions described herein could be omitted while keeping with the teachings of this disclosure and being encompassed by the claimed subject matter. Similarly, various operations or functions or groups of operations may be repeatedly performed based on a particular control loop, and/or performed in response to a particular input or event. The descriptions of methods or processes are provided for the purpose of illustrating certain embodiments, and should be understood to be representative of one of many variations and not limited to only those shown or described.

As generally understood by those of ordinary skill in the art, the system or method may be implemented through a computer algorithm, machine executable code, or software instructions programmed into one or more suitable programmable devices associated with the vehicle, such as VCM 172, BECM 146, another controller, or a combination thereof.

Operation of system or method 400 includes storing expected or desired values for various battery operating parameters as represented at 410 in a non-transitory computer readable medium or memory for subsequent use in detecting lithium plating and/or controlling one or more vehicle or battery operations that may affect lithium plating. As previously described, battery parameter values may include expected or desired values for open circuit voltage of a representative cell or group of cells corresponding to current battery and/or ambient operating conditions. Internal battery cell resistance may also be stored for subsequent use in calculating OCV of a cell based on a measured cell voltage. Stored values may also include a battery power vs. temperature lookup table and an accumulated plating history counter. The accumulated plating history counter may limit the number of times that a charging strategy that is likely to result in plating may be selected. For example, an urgent or emergency charging mode selected in response to detection of plating may be limited to a total of ten or twenty events over the life of the vehicle or battery. The limit may also correspond to a total number of amp-hours (Ah) rather than a total number of events depending on the particular application and implementation.

Current operating conditions are measured or otherwise determined for various battery parameters as represented by block 412. Representative parameters may include cell voltage, cell current, SOC, and temperature as represented at 414. One or more lithium plating parameters or indicators are determined as represented by block 416. As previously described, lithium plating parameters or indicators may be based on a differential cell voltage 418, which may include a differential OCV, for example. Alternatively, measured OCV may be calculated using measured cell current, voltage, and internal resistance as previously described and represented at 420. A ratio of differential voltage may be calculated as represented at 424, and may include a ratio of differential voltage or changing voltage to cell charging rate as represented at 426. One or more lithium plating indicator values may be compared to a corresponding parameter to detect lithium plating as represented at 428.

If lithium plating is detected based on one or more plating parameters crossing corresponding threshold levels at 428, a default plating mitigation charging strategy may be activated as represented at 430. The default strategy may include directly or indirectly warming the battery as represented at 432. This may include controlling battery current to indirectly heat the battery by activation one or more electrical accessories, for example. Direct warming may include controlling a battery heater or directing warm cabin air through the battery, for example. The default strategy may stop or reduce the charging rate to a point where no lithium plating is detected based on the calculated value of the one or more plating parameters relative to corresponding thresholds. In one embodiment, closed loop control of the charging rate is implemented based on the plating parameter value as represented at 434. The closed loop controller operates to increase, decrease, and/or stop the charging current for the current battery temperature as needed.

Referring now to FIGS. 1 and 4, as previously described, in response to detection of lithium plating, the charge light 184, display 180, and/or mobile device 190 may be programmed to display or sound an alert, message, or other indication of lithium plating and implementation of a plating mitigation charging strategy. In one embodiment, a message is displayed indicating that low battery temperature is affecting the charging rate. The display 180 and/or mobile device 190 may include a user interface to display the message and prompt a user for input with respect to selection of a charging strategy as represented at 440.

The user interface may present a number of charging strategies for selection by the user. The available charging strategies may vary by application and implementation, and may vary based on current operating conditions, such as the accumulated plating history, SOC, temperature, etc. In one embodiment, the user interface includes options to use the default plating mitigation charging strategy as represented at 442, to select a quick charge option as represented at 444, and to select an urgent or emergency charging strategy as represented at 446. The battery and/or vehicle are then controlled to implement the selected charging strategy as represented by block 450.

The default plating mitigation charging strategy will continue to charge the battery, but at a lower rate and/or consuming additional energy to warm the battery by operating electrical accessories to increase battery current, which may include direct warming by a battery heater, for example. The user interface may include an estimated charge completion time and/or consumed energy or energy cost associated with selection or confirmation of each available charging strategy. Representative information may include the number of hours needed to fully or partially charge the battery, or to achieve a sufficient charge to travel a specified distance, or to a specified destination, for example.

Selection of the quick charge strategy as represented at 444 provides faster charging than the default plating mitigation strategy. The engine controller may cycle the battery with battery power and charge power to warm the battery faster. Accessories such as the vehicle air conditioning system, passenger cabin heater, and/or rear window defogger may be operated as electrical loads 160 to cycle the battery and provide faster warming than the default strategy. This strategy will consume more energy than the default strategy. Similar informational messages may be displayed with respect to estimated charging time, distance, power, etc. as previously described. This strategy may control charging rate or current to a level that results in some reversible plating to reduce the charging time required for a partial or complete charge.

The urgent or emergency charging strategy represented by block 446 employs various methods described with respect to the quick charge strategy 444 and default strategy 442, but allows higher charging current that may result in a limited amount of irreversible lithium plating to reduce charging time. The accumulated plating history counter may limit the number of times that the emergency charging strategy may be selected, or may require vehicle service to test the battery before resetting the counter or increasing the limit to prevent significant performance degradation associated with irreversible plating and anode damage. Strategy 446 may be limited to a number of occurrences, or to a total number of amp-hours, for example.

As those of ordinary skill in the art may recognize, the representative embodiments described may provide one or more advantages such as providing flexibility for the user to control battery charging strategy based on anticipated driving needs. This may reduce range anxiety by providing additional user control over the charging process while eliminating or limiting any battery performance degradation associated with lithium plating.

While representative embodiments are described above, it is not intended that these embodiments describe all possible forms of the claimed subject matter. Rather, the words used in the specification are words of description rather than limitation, and it is understood that various changes may be made without departing from the spirit and scope of the disclosure. Additionally, the features of various implementing embodiments may be combined to form further embodiments that are not explicitly described or illustrated. While various embodiments may have been described as providing advantages or being preferred over other embodiments or prior art implementations with respect to one or more desired characteristics, as one of ordinary skill in the art is aware, one or more features or characteristics may be compromised to achieve desired overall system attributes, which depend on the specific application and implementation. These attributes include, but are not limited to: cost, strength, durability, life cycle cost, marketability, appearance, packaging, size, serviceability, weight, manufacturability, ease of assembly, etc. Embodiments described as less desirable than other embodiments or prior art implementations with respect to one or more characteristics are not necessarily outside the scope of the disclosure and may be desirable for particular applications.

What is claimed is:

1. A vehicle comprising:
    a traction battery having cells; and
    a controller in electrical communication with the traction battery and programmed to
        responsive to lithium plating being detected, prompt a user to select one of multiple charging strategies each having different charging rates, and
        responsive to the user selecting one of the strategies, control traction battery charging according to the selected one of the strategies.

2. The vehicle of claim 1, the controller programmed to store an accumulated number of selections for at least one of the charging strategies, and to limit the number of selections for the at least one charging strategies.

3. The vehicle of claim 1, the controller programmed to communicate with a linked mobile device and to prompt the user to select one of the multiple charging strategies via the mobile device.

4. The vehicle of claim 1, the controller programmed to implement a default charging strategy to mitigate lithium plating in response to detection of lithium plating until a user-selected charging strategy is selected.

5. The vehicle of claim 4 wherein the default charging strategy reduces traction battery charging rate relative to a charging strategy where no lithium plating is detected.

6. The vehicle of claim 1, at least one of the charging strategies increasing battery charging current to a charging rate that results in lithium plating to reduce charging time.

7. The vehicle of claim 6, wherein the lithium plating is irreversible lithium plating.

8. The vehicle of claim 1, the controller programmed to detect lithium plating in response to a lithium plating indicator based on a difference between a measured open circuit voltage of the at least one cell and a previously stored open circuit voltage value.

9. The vehicle of claim 1, the controller programmed to detect lithium plating in response to a lithium plating indicator based on a ratio of the differential cell voltage and cell current during charging of the traction battery.

10. A vehicle having a traction battery with at least one cell, comprising:
a controller coupled to the traction battery and programmed to control traction battery charging in response to a user-selected charging strategy based on a prompt to select a charging strategy initiated in response to traction battery lithium plating being detected by the controller.

11. The vehicle of claim 10, the controller programmed to prompt a user for selection of one of a plurality of charging strategies, at least one of the plurality of charging strategies resulting in a charging current associated with additional lithium plating to reduce charging time.

12. The vehicle of claim 11, the controller programmed to limit a number of times the at least one of the plurality of charging strategies may be selected.

13. The vehicle of claim 11, the controller programmed to present the at least one of the plurality of charging strategies only if an accumulated number of selections of the at least one of the plurality of charging strategies is less than a predetermined number stored in a memory in communication with the controller.

14. The vehicle of claim 10 further comprising a display having a user interface configured to prompt a user for selection of one of a plurality of charging strategies each associated with a different charging rate and lithium plating level.

15. The vehicle of claim 10, the controller programmed to receive user input from a linked wireless device having a user interface configured to prompt a user to select one of a plurality of charging strategies.

16. The vehicle of claim 10, the controller programmed to operate at least one electrical accessory to warm the battery based on the user-selected charging strategy.

17. A method implemented by a vehicle controller in a vehicle having a traction battery, comprising:
controlling, by the controller, traction battery charging according to a user-selected charging strategy that is selected from one of a plurality of available charging strategies, each having a different charging rate and displayed on a user interface in response to detection of lithium plating in the traction battery, at least one of the charging strategies being associated with additional lithium plating if selected.

18. The method of claim 17 further comprising displaying an estimated charging time for each of the plurality of available charging strategies on the user interface.

19. The method of claim 17 further comprising limiting user selection of the at least one charging strategy to a predetermined number of selections.

* * * * *